United States Patent
Coenen

[19]

[11] Patent Number: 6,131,937
[45] Date of Patent: Oct. 17, 2000

[54] SIDE STRUT FOR THE LOWER STEERING ARM OF A TRACTOR

[75] Inventor: Herbert Coenen, Königswinter, Germany

[73] Assignee: GKN Walterscheid GmbH, Lohmar, Germany

[21] Appl. No.: 09/167,280

[22] Filed: Oct. 7, 1998

[30] Foreign Application Priority Data

Oct. 8, 1997 [DE] Germany .......................... 197 44 328

[51] Int. Cl.[7] ................................................. B60D 1/32
[52] U.S. Cl. ..................... 280/455.1; 92/75; 92/130 R; 172/450
[58] Field of Search .............................. 280/455.1, 460.1, 280/468; 180/403; 267/64.11, 64.13, 64.12; 188/322.15; 92/130 C, 134, 132, 75, 50, 130 R; 172/450, 439, 446, 677, 678, 679, 680

[56] References Cited

U.S. PATENT DOCUMENTS

| 2,756,989 | 7/1956 | Peras .......................................... 267/64 |
| 2,806,723 | 9/1957 | Fairclough . |
| 3,098,644 | 7/1963 | Phillips ................................. 267/64.11 |
| 3,347,044 | 10/1967 | Medley .................................. 92/130 R |
| 4,191,280 | 3/1980 | Copperwheat ........................... 172/439 |
| 4,469,289 | 9/1984 | Gebo . |
| 4,564,176 | 1/1986 | Schnetz ................................. 267/64.11 |
| 5,248,131 | 9/1993 | Jobelius ................................ 267/64.11 |
| 5,595,410 | 1/1997 | Wilson et al. . |

FOREIGN PATENT DOCUMENTS

| 67965 | 10/1975 | Australia ........................... 280/461 A |
| 0 452 702 B1 | 2/1995 | European Pat. Off. . |
| 35 05 243 C3 | 4/1989 | Germany . |
| 195 37 555 A1 | 4/1997 | Germany . |
| 1242322 | 8/1971 | United Kingdom . |
| 2 012 856 | 8/1979 | United Kingdom . |
| 2172082 | 9/1986 | United Kingdom . |

*Primary Examiner*—Daniel G. DePumpo
*Attorney, Agent, or Firm*—Harness, Dickey & Pierce, P.L.C.

[57] ABSTRACT

A side strut (5) for a lower steering arm (1) of a tractor has a single action hydraulic cylinder (9) whose piston (12) includes first attaching means (6) to be connected to the rear of the tractor. The strut (5) also has a telescopic unit (10) and a setting unit (11). The hydraulic cylinder (9), the telescopic unit (10) and the setting unit (11) are arranged, one behind the other on a longitudinal axis (20). The setting unit serves to achieve a categorical setting and the telescopic unit (10) serves to offset the change in the length of the side strut (5) when the lower steering arm is deflected sideways.

5 Claims, 3 Drawing Sheets

SIDE STRUT FOR THE LOWER STEERING ARM OF A TRACTOR

CROSS-REFERENCE TO RELATED APPLICATIONS

This application is based upon and claims priority to German Application No. 197 44 328.1 filed Oct. 8, 1997.

BACKGROUND OF THE INVENTION

The invention relates to a side strut for the lower steering arm of a tractor. The side strut has a single-action hydraulic cylinder with a piston and a cylinder housing. A first attaching means is connected to the piston. A telescopic unit, which includes a guiding housing and an adjustable telescopic element, is coupled with the cylinder housing. A setting unit, which includes a threaded spindle, is coupled with the telescopic unit. A second attaching means is connected to the threaded spindle.

A side strut is described in DE 195 37 555 A1. The telescopic element is in the form of a pipe which is adjustable on the cylinder housing of the hydraulic cylinder. There are no stops to limit the maximum length. Thus, sufficient overlap exists for the telescopic element to prevent the unit from falling apart. To achieve the basic position, a separate spring is provided which is arranged between the lower steering arm and an articulation point at the rear of the tractor. The spring is designed in such a way that the piston of the hydraulic cylinder cannot be moved-in in the unpressurized condition.

The stabilizing function of side struts also has to ensure that the lower steering arms, especially if the implement is not attached, cannot swing against the tires. In addition, the side struts must ensure that the design-related degrees of freedom of the connecting elements are not exceeded. Also, the struts ensure the adjustable spread between the coupling hooks.

DE 35 05 243 C3 describes a side stabilizer for the lower steering arms of a three-point attaching device. The side stabilizer has two telescopic parts which are adjustable relative to one another. The parts are held in a preferential position by a spring force. A change in length against the spring force is possible in both directions (in the lengthening and shortening sense). In this way, the movement of the lower steering arms may be dampened in both pendulum directions. Furthermore, a pin may be inserted for total locking.

SUMMARY OF THE INVENTION

It is an object of the invention to provide a side strut which restricts the degree of freedom of the associated lower steering arm. The side strut, in cooperation with a further strut, identically designed and associated with the other lower steering arm, is returned into a basic position in the load-free condition. The force is advantageously accommodated in both set directions.

In accordance with the invention, a hydraulic cylinder, telescopic unit and setting unit are arranged one behind the other on a common longitudinal axis. Guiding rings with a pressure spring positioned between the rings are positioned on a first portion of the telescopic element which projects into a guiding housing. The guiding ring arranged towards the end face of the telescopic element in the guiding housing is supported against a stop ring secured to the telescopic element. The guiding ring may also be affixed to the telescopic element. The guiding ring, remote from the hydraulic cylinder, is supported against a stop at the guiding housing. The end face of the first telescopic portion arranged towards the hydraulic cylinder is supported against a supporting face of the cylinder. The supporting face delimits the guiding housing towards the hydraulic cylinder. A second portion of the telescopic element is connected to the first portion. The second portion projects away from the hydraulic cylinder out of the guiding housing towards the second attaching means. The second portion, at its end projecting from the guiding housing, includes a bore with inner threads to receive the threaded spindle.

An advantage of this assembly is that the pressure spring and the end stops ensure that the basic position is assumed. A further advantage is that the spring is directly arranged on the longitudinal axis of the components of the telescopic unit. Thus, there is no eccentric force at play. The return movement is thus easy-going. Furthermore, by arranging the hydraulic unit, telescopic unit and setting unit on the longitudinal axis, one behind the other, a short installation length is achieved. The end stops hold the unit together. Thus, the components cannot disengage from one another. By assembling the parts in pairs and due to the resulting kinematics during lateral movement with the attached implement, it is ensured that the resulting forces are advantageously accommodated. Due to the direction of pressure application, the force is introduced in a planar way. This is due to the fact that the telescopic element, by its end face, comes to rest against a supporting face in a planar way. In addition, in the direction of pressure application, the forces are centered onto the longitudinal axis.

A particularly advantageous embodiment is achieved if the axial path of adjustment of the telescopic element, towards the guiding housing, is greater than the stroke of the piston in the cylinder housing. This means that the piston stroke is smaller than the floating path. In addition, this takes into account the special conditions resulting from the kinematics. When the lower steering arms are deflected relative to the longitudinal axis of the tractor, the extent of lengthening occurring at the side strut associated with the lower steering arm approaching the longitudinal axis is greater than the extent of shortening occurring at the side strut whose associated lower steering arm moves away from the longitudinal axis of the tractor. As the floating path of the telescopic unit is greater than the stroke of the piston of the hydraulic unit, the side strut associated with the lower steering arm moving away from the longitudinal axis of the tractor is pressure-loaded. However, the side strut associated with the lower steering arm approaching the longitudinal axis of the tractor is substantially load-free. Thus, lengthening only occurs within the limits of the force which is required to compress the pressure spring. Overall, the system ensured that even if different lengths are set, a defined force behavior occurs since one strut is always pressure-loaded.

The guiding housing is preferably provided in the form of a pipe which is non-removably connected to the guiding housing. A welded connection is suitable. This means that, simultaneously, the outer face of the base of the cylinder housing can be used as a supporting face for the telescopic element. Furthermore, the amount by which the telescopic element is extracted from the guiding housing against the force of the pressure spring can be limited by arranging a sleeve between the guiding rings. When the end of travel has been reached, the first guiding ring comes to rest against the first end face of the sleeve. The other end face of the sleeve is supported against the second guiding ring. The second guiding ring, in turn, is supported against a stop in the guiding housing. The stop can be in the form of a securing ring.

From the following detailed description, taken in conjunction with the drawings and subjoined claims, other objects and advantages of the present invention will become apparent to those skilled in the art.

BRIEF DESCRIPTION OF THE DRAWINGS

The way in which the side struts are associated with the lower steering arms of a three-point attaching device of a tractor; the conditions of movement occurring in the case of a lateral movement; and two embodiments of the side strut are diagrammatically illustrated in the drawing wherein.

DETAILED DESCRIPTION OF THE PREFERRED EMBODIMENT

Figure 1:
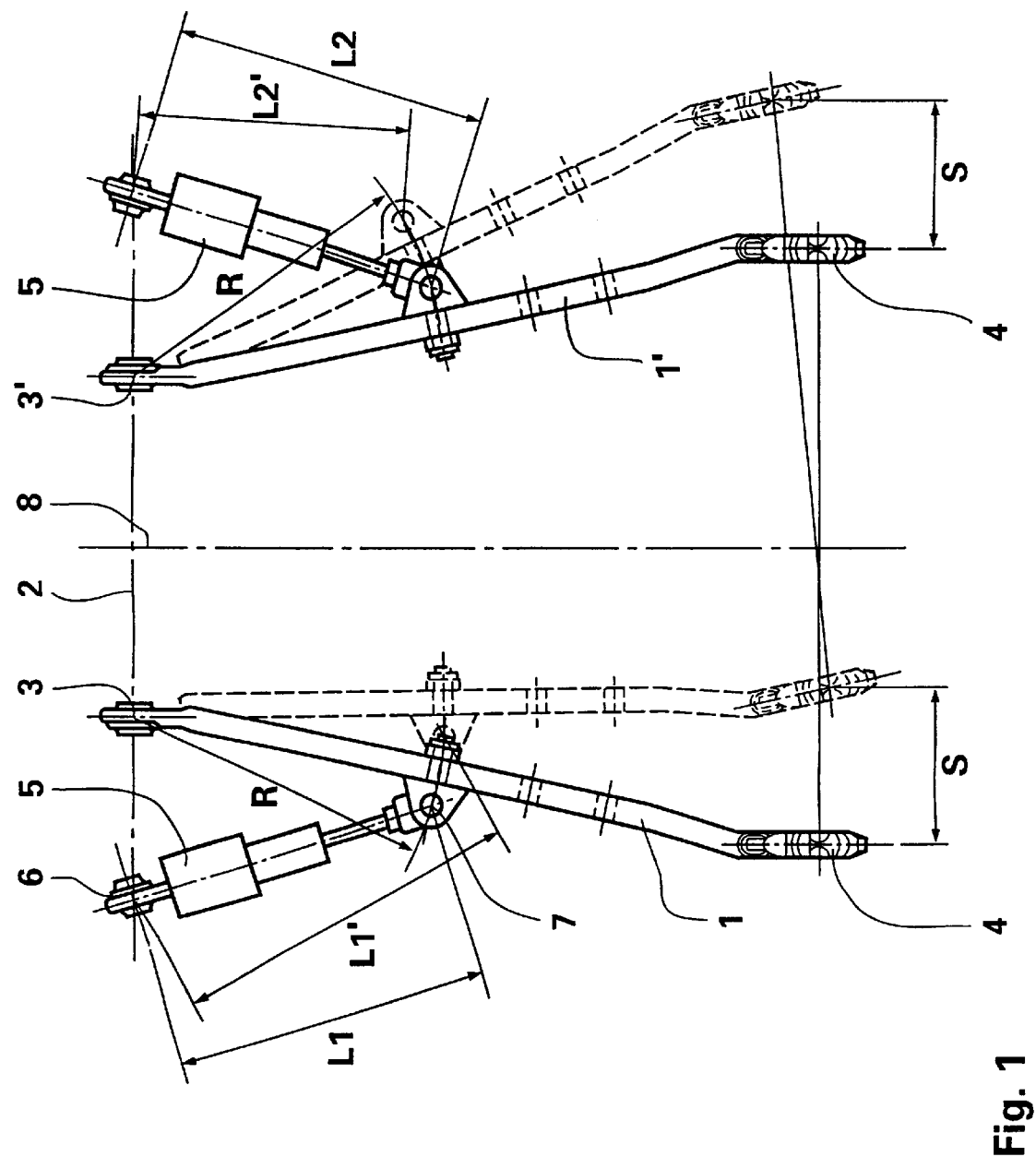
FIG. 1 is a plan view of a diagrammatic illustration of the lower steering arms of a three-point attaching device of a tractor with associated side struts.

FIG. 1 is a plan view of two lower steering arms 1, 1'. The steering arms are pivotable around a pivot axis 2, represented by suitable attaching means at the tractor rear, and around the fixing points 3, 3' at the tractor rear. The two fixing points 3, 3' are arranged at identical distances to each side of a longitudinal axis 8 of the tractor. The two lower steering arms 1, 1' carry out lateral and lifting movements. Pivot movements around the pivot axis 2 upwards and downwards are out of the drawing plane and into the drawing plane. This is shown where out of the position is in continuous lines and into the position is in dashed lines.

Struts 5 are provided to stabilize lateral movements or to prevent lateral movements of the two lower steering arms 1, 1'. The two free ends of the lower steering arms 1, 1' have coupling hooks 4. The coupling hooks 4 receive corresponding coupling means at the implement to pull or carry the implement. The lower arms 1, 1' work in cooperation with the upper steering arm (not illustrated) which is arranged on the longitudinal axis of the tractor. Normally, the upper arm is centered above the pivot axis.

The two side struts 5 are secured at one end at the tractor rear by first attaching means 6. The attachment is laterally offset relative to the fixing points 3, 3' at corresponding fixing means which are centered on the pivot axis 2. The side struts 5, at their other end, are connected to the two lower steering arms 1, 1' by attaching means 7. The attaching means 6, 7 enable a pivot movement. It can also be seen in FIG. 1 that the pivot axis of the attaching means 7 are arranged with a radius R relative to the fixing points 3, 3'. Thus, the pivot axis of the attaching means 7 carries out a pivot movement with the radius R around the fixing points 3, 3'.

If, with an attached implement, a lateral movement S occurs at both lower steering arms 1, 1', and if a displacement of the two lower steering arms 1, 1' takes place from the position shown in continuous lines into the position shown in dashed lines, the two lower steering arms 1, 1', starting from identical distances of L1 and L2, between the pivot axes of the two articulation points 6, 7 are subject to a change. At the lower steering arm 1, the dimension L1 increases to L1'. The dimension L2 is shortened to L2'. The order of magnitude of the changes in length varies. If the lower steering arms 1 and 1', respectively, pivot clockwise around the fixing points 3 and 3', respectively, the length L1 is shortened and the length L2 is increased. If the length is shortened, care must be taken to ensure that the lower steering arm 1', for example, in its position indicated by the dashed lines, cannot hit the rear wheels.

The two side struts 5 hold the attached implement centered on the longitudinal tractor axis 8 if the implement is in the raised position, in the transport position. The same applies if no implement is attached and the lower steering arms 1, 1' are in the transport position. In this condition, the two side struts 5 ensure that the lower steering arms 1, 1' are held so that they cannot move sideways from the set dimension of the longitudinal tractor axis outwardly towards the wheels.

Two embodiments of the side struts 5, 5' which meet the above requirements will be explained in greater detail with reference to FIGS. 2 and 3.

Figure 2:
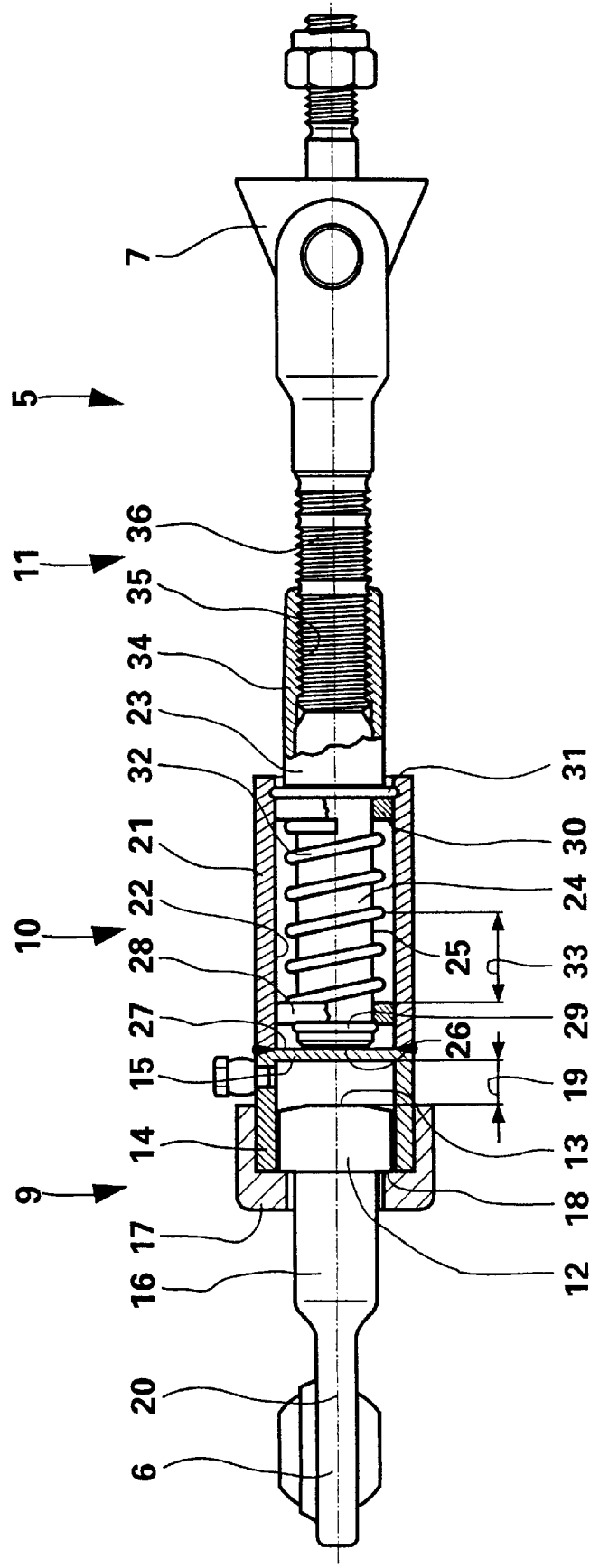
FIG. 2 is a longitudinal section view of a side strut of a first embodiment of the invention.

FIG. 2 shows a first embodiment of a side strut 5 with a longitudinal axis 20. The side strut 5 includes a hydraulic cylinder 9, a telescopic unit 10 and a setting unit 11. These elements are arranged one behind the other on the longitudinal axis 20. The telescopic unit 10 follows the hydraulic cylinder 9. The setting unit 11 follows the telescopic unit 10.

The hydraulic cylinder 9 has a cylinder housing 14 which includes piston 12. Only one end of the piston 12 may be pressure-loaded. The piston face 13 points towards the telescopic unit 10 and to the housing base 15, respectively. The piston rod 16 extends through an aperture in the cover 17. The cover 17 closes the cylinder housing 14. The inner cover face of the cover forms a stop for the piston annular face 18. The annular face 18 is between the outer diameter of the piston 12 and the piston rod 16. The piston rod 16 carries the first attaching means 6, which may be the form of a spherical eye. The hydraulic cylinder thus has a single-action piston 12. The piston can only be loaded in the extending sense. The stroke 19 of the hydraulic cylinder 9 corresponds to the maximum travel of the piston 12. The piston face 13 moves away from its contact with the housing base 15 during extension.

The guiding housing 21 of the telescopic unit 10 is connected to the housing base 15. The guide housing 21 is a sleeve with one end face connected to the wall of the cylinder housing 14 by a weld. Telescopic element 23 is adjustably received in the bore 22 of the guiding housing 21. The telescopic element 23 moves along the longitudinal axis 20. The telescopic element 23 has a first portion 24 which enters the guiding housing 21 to a greater or lesser extent. In the starting condition illustrated, the first portion 24 is fully contained in the guiding housing 21.

The first portion 24 is associated with two guiding rings 28, 30. The first guiding ring 28 is arranged close to the end face 26 positioned opposite the housing base 15. The first guiding ring 28, by means of a bore, is positioned on the cylindrical outer face 25 of the first portion 24. Towards the hydraulic cylinder 9, the first guiding ring is axially supported against a stop ring 29. The stop ring 29 is secured to the first portion 24. It is also possible to provide the first guiding ring 28 as an integral part of the first portion 24.

In the condition of rest of the side strut 5, the end face 26 is in contact with the supporting face 27. The supporting face 27 forms part of the cylindrical housing 14.

A second guiding ring 30 is provided at a distance from the first guiding ring 28. The second guiding ring 30 is on the outer face 25 of the first portion 24. A pressure spring 32 is arranged between the two guiding rings 28, 30. The second guiding ring 30 is axially supported in the bore 22 against a securing ring 31 inserted at the free end of the guiding housing 21. The telescopic element 23, via the pressure spring 32 and via the first guiding ring 28, is held in the position displaced towards the hydraulic cylinder 9.

The telescopic element 23 is preferably pretensioned so that its end face 26 is firmly supported against the supporting face 27. To increase the length of the first portion 24, the telescopic element 23 includes a second portion 34. The second portion 34 is centered on the longitudinal axis 20. The second portion emerges from the end of the guiding housing 21 which points away from the hydraulic cylinder 9. The telescopic path, which the first portion 24 covers in the guiding housing 22, against the force of the pressure spring 32, starts from the contact point between its end face 26 and the supporting face 27 away from the hydraulic cylinder 9 towards the right in the drawing, corresponds to the telescopic path 33 shown in the drawing of FIG. 1.

The maximum telescopic path is determined by the compression of the windings of the pressure spring 32. When the windings reach their maximum rate of compression, the end of the telescopic path and thus maximum extension is reached. The design-related dimensions are such that the telescopic path 33 is greater than the stroke 19. Thus, in the assembled condition, in the direction of extension of the telescopic unit 10, the associated components and especially the securing ring 31 cannot be subjected to operational loads. This design measure ensures that the main load is accommodated in the shortening sense.

If a force is applied in the direction of pressure, the force is transmitted in a planar way by the end face 26 onto the supporting face 27 on the longitudinal axis 20. Thus, this ensures that the greatest possible guiding length and thus the greatest distance is maintained between the two guiding rings 28, 30. The two guiding rings 28, 30 guide the first portion 24 of the telescopic element 23 in the bore 22 of the guiding housing 21.

The second portion 34 which projects from the guiding housing 21 has a bore with an inner thread 35. The bore's inner thread receives a threaded spindle 36. The threaded spindle forms part of the setting unit 11. The second attaching means 7 is at the end of the threaded spindle 36. The second attaching means is connected to the lower steering arm. The second attaching means 7 has a yoke head and an attaching element.

The attaching element is received between the yoke head and is pivotable around an axis. The attaching element includes a threaded end which is secured to the lower steering arm. Both the yoke head and attaching element are connected to one another so as to be pivotable around a pivot pin. The threaded spindle 36 sets the basic distance between the two sets of attaching means. This achieves a categorical setting of the lower steering arms relative to one another.

In accordance with FIG. 1, a setting operation takes place in both side struts associated with the lower steering arms to set the dimension of spread between the two coupling hooks. The dimension of spread and the categorical setting are dependent on the attached implement. The hydraulic cylinder stabilizes the lower steering arms in the raised condition. Thus, pressure is applied when the lower steering arms are raised. In addition, this measurement ensures that the end face 26 of the telescopic element 23 is held in contact with the supporting face 27.

Figure 3:
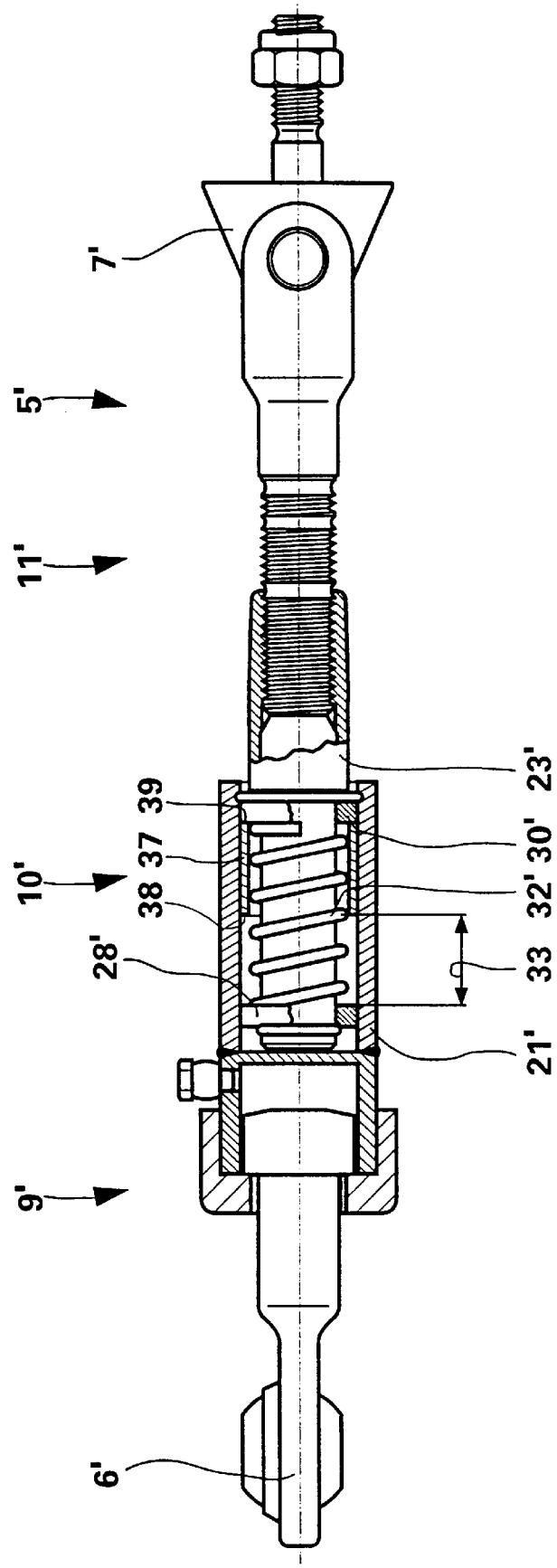
FIG. 3 is a longitudinal section view of a side strut in accordance with a second embodiment of the invention.

In FIG. 3, the maximum telescopic path 33 is achieved by the fully compressed pressure spring. The telescopic path of the telescopic element 23', in the embodiment of the side strut 5' according to FIG. 3, is limited to the telescopic path 33 by the sleeve 37 co-axially arranged around the pressure spring 32' in the guiding housing 21'. Here, the first end 38 of the sleeve 37 points toward the first guiding ring 28' and the second end 39 of the sleeve 37 points towards the second guiding ring 30'. The sleeve 37 can be floatingly arranged. The possible telescopic travel is effected by the movement of the telescopic element 23'. Accordingly, the telescopic element 23' is extracted from the guiding housing 21' until the first guiding ring 28' comes to rest against the first end face 38 of the guiding sleeve 37. The second end 39 of the sleeve 37 is supported against the second guiding ring 30'. Otherwise, the remaining components of the hydraulic cylinder 9', the telescopic unit 10' and the setting unit 11' and of the first and second attaching means 6', 7' correspond to the embodiment as illustrated in, and described with reference to, FIG. 2.

While the above detailed description describes the preferred embodiment of the present invention, the invention is susceptible to modification, variation and alteration without deviating from the scope and fair meaning of the subjoined claims.

What is claimed is:

1. A side strut for a lower steering arm of a tractor, comprising:

a single-action hydraulic cylinder with a piston and a cylinder housing;

first attaching means coupled with said piston;

a telescopic unit including a guiding housing and an adjustable telescopic element in said guiding housing;

a setting unit including a threaded spindle;

second attaching means coupled with said threaded spindle, wherein said hydraulic cylinder, telescopic unit and setting unit are arranged adjacent each other on a common longitudinal axis; and a first portion of the telescopic element projects into the guiding housing, first and second guiding rings with a pressure spring therebetween are positioned on said first portion, said first guiding ring arranged towards an end face of the first portion in the guiding housing and being supported against a stop ring secured to the telescopic element or being fixably connected to the telescopic element, and said second guiding ring arranged remote from said hydraulic cylinder supported against a stop at the guiding housing, said end face of the first portion arranged towards the hydraulic cylinder being supported against a supporting face which delimits the guiding housing towards the hydraulic cylinder;

a second portion of said telescopic element connected to the first portion, said second portion projects away from the hydraulic cylinder out of the guiding housing towards the second attaching means and, at its end projecting from the guiding housing includes a bore with inner threads for receiving the threaded spindle.

2. A side strut according to claim 1, wherein in an unloaded condition, the pressure spring presses the end face of the telescopic element with pretension against the supporting face.

3. A side strut according to claim 1, wherein the axial path of adjustment of the telescopic element towards the guiding housing is greater than the stroke of the piston in the cylinder housing.

4. A side strut according to claim 1, wherein the guiding housing is non-removably connected to the cylinder housing.

5. A side strut according to claim 1, wherein an axial path of adjustment of the telescopic element away from the hydraulic cylinder is delimited by a sleeve arranged between the guiding rings.

* * * * *